(No Model.)
W. L. BLISS.
DRIVING MECHANISM FOR DYNAMOS LOCATED ON RAILWAY CARS.
No. 534,851. Patented Feb. 26, 1895.
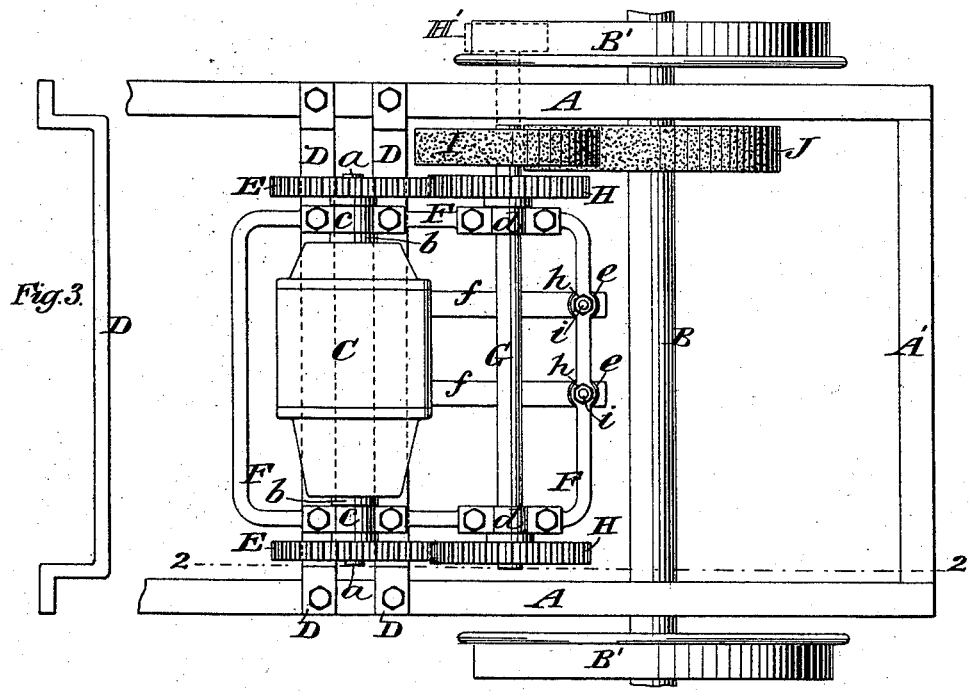
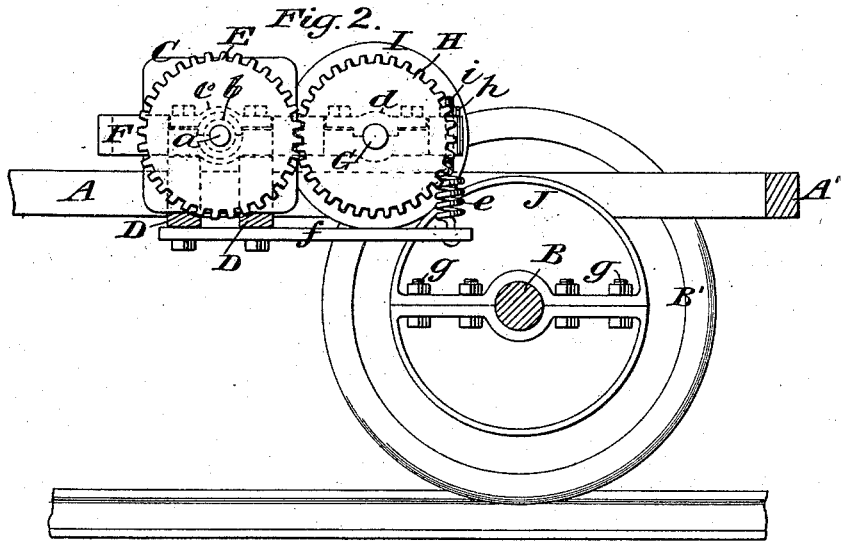
Witnesses:
C. E. Sundgren,
George Barry.
Inventor:
William L. Bliss
by attorneys
Brown & Seward

UNITED STATES PATENT OFFICE.

WILLIAM L. BLISS, OF BROOKLYN, NEW YORK.

DRIVING MECHANISM FOR DYNAMOS LOCATED ON RAILWAY-CARS.

SPECIFICATION forming part of Letters Patent No. 534,851, dated February 26, 1895.

Application filed August 17, 1894. Serial No. 520,550. (No model.)

*To all whom it may concern:*

Be it known that I, WILLIAM L. BLISS, of the city of Brooklyn, in the county of Kings and State of New York, have invented a new and useful Improvement in Driving Mechanism for Dynamos Located on Railway-Cars, of which the following is a specification.

This invention relates to the driving of a dynamo placed upon or supported by the truck of a railway car for illuminating or other purposes by utilizing the rotary motion of one of the axles of the car for such driving. Its object is to provide a very simple driving mechanism for that purpose which permits the dynamo to be rigidly attached to the car truck and yet free from the effects of the sudden and destructive pounding and vibration of the car wheels and axles, and which dispenses with all unnecessary fittings and attachments to the car axles.

I will first describe my invention in detail with reference to the accompanying drawings and afterward point out its novelty in the claims.

Figure 1 of the drawings represents a plan view of the dynamo and its driving mechanism applied to a car truck, only so much of the truck being represented as is necessary to illustrate the invention. Fig. 2 represents a vertical section taken in the line 2, 2, of Fig. 1. Fig. 3 is a face view of one of the beams by which the dynamo is supported on the truck.

A A' designate the frame of the car truck, B designates one of the axles thereof, and B' B' the driving wheels on said axle all of which may be constructed and combined as in ordinary railway cars.

C is the dynamo which may be of any known or suitable kind and may be supported on the truck frame at a suitable distance from the axle B, in any suitable or convenient manner, but which is represented as mounted directly upon two iron beams D D which rest upon the wheel guards or sides A A of the truck frame and are depressed between the said sides or guards D D to bring the dynamo to a suitable depth below the car body. The shape of these beams is represented in Fig. 3. The armature shaft $a$ of the dynamo projects through the bearings $b\ b$ which are provided for it in the cheeks or sides of the dynamo framing and outside of these bearings it is provided at each end with a spur gear E. The bearings $b\ b$ are turned true on their outer surfaces concentric with the shaft $a$ to form trunnions or pivots, and the so formed pivots are fitted to bearings $c\ c$ provided in a yoke F F, which, by the pivotal connection thus formed, is adapted to swing when necessary about the axis of the dynamo. The yoke F F has also provided in it bearings $d\ d$ for a countershaft G on which there are two spur gears H H gearing with the spur gears E E on the armature shaft of the dynamo. The said countershaft is also furnished with a friction wheel I the periphery of which is intended to run in contact with the periphery of a friction wheel J on the axle B, and to be held in contact therewith by springs $e\ e$, the upper ends of which are connected with the yoke F F and the lower ends are connected with bars $ff$ bolted to the supporting beams D D of the dynamo. The contact of the friction wheels being thus maintained, rotary motion is transmitted through said wheels from the axle B to the countershaft G and thence through the gears H E to the dynamo shaft $a$.

The friction wheel J on the axle is divided diametrically into two parts which are clamped together upon the axle B by means of bolts $g$ in such manner as to secure the wheel to the axle without the use of set screws upon the axle or in any way marking or tooling the same. The contact surfaces of the friction wheels I and J may be roughened or prepared in any suitable manner to produce a desirable degree of friction between them.

The springs $e\ e$ which are represented of coiled form, are shown as having their upper ends extended in the form of screws $i$ which project upward through and above the yoke and are fitted with nuts $h$ for the purpose of adjusting the tension of the said springs and the pressure of the friction wheel I upon the friction wheel J. By the removal of these nuts, the yoke F with the countershaft G and its gears H H may be lifted up and turned back over the dynamo and out of the way of the axle and car wheels to facilitate work on the latter when necessary.

The yoke is represented as a complete frame surrounding the dynamo and the armature shaft, but it may simply consist of two side bars containing the bearings c and d, which would serve to maintain the proper relation between the pitch lines of the gears E and H, or it might be of C-form, that is to say, open at one end, though the rectangular form represented is preferable. It is obvious that weights might be applied to the yoke F instead of the springs for the purpose of maintaining the proper frictional contact between the friction wheels.

I have shown in dotted outline in Fig. 1, how the friction wheel J may be dispensed with, that is to say, by prolonging the countershaft G beyond the truck frame and furnishing it with a friction wheel H' to run in direct contact with one of the car wheels B', the said car wheel thus being made to constitute a friction driving wheel. Springs might be introduced between the beams D D and the dynamo to absorb the vibrations of the truck frame in case such vibrations are found objectionable.

What I claim as my invention is—

1. In combination, a car truck, a car axle, a friction wheel thereon, a dynamo supported on the truck, a dynamo shaft having a spur gear thereon, suitable bearings for the said shaft, a yoke pivoted to swing on bearings concentric to the dynamo shaft bearings, a countershaft mounted to rotate in the said yoke and provided with a spur wheel intermeshing with the spur wheel on the dynamo shaft, and a friction wheel on said countershaft engaging the friction wheel on the car axle, whereby the rotation of the car axle rotates the dynamo shaft, substantially as set forth.

2. In combination, a car truck, a friction wheel thereon, a dynamo mounted on the car truck, a dynamo shaft mounted to rotate in suitable bearings, spur wheels on the dynamo shaft, a yoke having a swinging movement on the bearings as a pivot, said yoke carrying a countershaft having spur wheels engaging with the spur wheels on the dynamo shaft, a friction wheel on said countershaft engaging the friction wheel on the car axle, and springs engaging the yoke for holding the friction wheels snugly together as the truck and car axle approach and recede from each other, substantially as set forth.

3. The combination with the car truck, the dynamo supported thereon and a friction driving wheel on one of the axles thereof, of a yoke pivoted to the dynamo on pivots concentric to the shaft thereof, a countershaft carried by said yoke and geared with the dynamo shaft, a friction wheel on said countershaft running in contact with said friction wheel on the axle, a spring for applying pressure to the said yoke and to the last mentioned friction wheel, and a connection substantially as described between said spring and yoke permitting the yoke and countershaft to be disengaged and turned back from over the axle, all substantially as herein set forth.

WILLIAM L. BLISS.

Witnesses:
JOHN L. BLISS,
JOHN BLISS.